United States Patent [19]

Szczepanek

[11] Patent Number: 4,736,368
[45] Date of Patent: Apr. 5, 1988

[54] PRIORITY TOKEN PROTOCOL CIRCUIT FOR A TOKEN RING LOCAL AREA NETWORK ADAPTOR

[75] Inventor: Andre Szczepanek, Brickhill, England

[73] Assignee: Texas Instruments Incorporated, Dallas, Tex.

[21] Appl. No.: 809,625

[22] Filed: Dec. 16, 1985

[51] Int. Cl.$^4$ .......................... H04J 3/16; H04Q 3/00
[52] U.S. Cl. ................... 370/89; 340/825.05
[58] Field of Search ............................ 370/86, 89, 90; 340/825.05, 825.5

[56] References Cited

U.S. PATENT DOCUMENTS

4,491,946  1/1985  Kryskow, Jr. et al. ............. 370/89
4,507,777  3/1985  Tucker et al. ...................... 370/86
4,604,742  8/1986  Hamada et al. ..................... 370/89

Primary Examiner—Douglas W. Olms
Assistant Examiner—Frank M. Scutch, III
Attorney, Agent, or Firm—Leo M. Heiting; N. Rhys Merett; Melvin Sharp

[57] ABSTRACT

A fairness protocol circuit for a token ring local area network adaptor having a data-in line for serially carrying tokens/frames and a shift register delay of at least 18 bauds with an input coupled to the data-in line. A TTT stack is coupled to the shift register delay for serially storing values of old token indicators. An III stack is provided for serially storing values of new token priority indicators. TTT means is coupled to the TTT stack for temporarily storing a last old token placed on the TTT stack and serially outputting its bits. The stacks shift up or down bit by bit in response to UNSTACK or STACK control signals and are cleared in response to a clear signal. III means is coupled to the III stack for outputting bit by bit the value of a last new token priority idicator "I" stored on the III stack while at the same time maintaining the value of the last new token priority indicator on the III stack immediately following the outputting and for replacing the last new token priority indicator stored with a reservation indicator "R" of the token and discarding the last new token priority indicator. Means are provided for comparing "P" and "I", "R" and "P" and "R" and "T". An output data modifier has inputs coupled to an output of the shift register delay, the TTT means, to a selected bit position of the shift delay and transmits a selected one of the inputs to the output in response to selected control signals applied thereto. Finally, a fairness state machine having inputs coupled to outputs of the comparing means and to an IEQZ output of the III stack is operative in response to selected combinations of its inputs to issue control signals to the stacks, the III means, the TTT means and the comparing means.

22 Claims, 10 Drawing Sheets

PRIORITY TOKEN PROTOCOL CIRCUIT FOR A TOKEN RING LOCAL AREA NETWORK ADAPTOR

BACKGROUND

The present invention relates to a priority protocol circuit particularly applicable to a token ring local area network adaptor.

A token ring local area network (LAN) is a data communications system which transfers data among a number of stations coupled to a one-way signal path. Each station has a host processor with memory and various periperal devices to function as an independent workstation. Access to the ring is controlled by token passing wherein a free or busy token is passed from one station to the next around the ring. An early example of the token ring is shown in U.S. Pat. No. 3,597,549 issued to Farmer & Newhall on Aug. 3, 1971 and assigned to Bell Telephone Laboratories. The Farmer & Newhall network discloses use of a supervisory station for resolving technical and administrative problems of communication on that loop such as to break in on the transmission of a station which is dominating the loop and to issue a signal that results in all stations losing loop control. Although Farmer & Newhall allows a mode in which control is passed from station to station within a loop without intervention by the supervisory station this occurs only as long as there are no more messages to be transmitted or until trouble develops in the loop. Otherwise, the loop is under control of the supervisory station.

In a further refinement IBM developed the so-called Munich ring which was reported at Proceedings of the National Telecommunications Conference, Nov. 1981, pp. A.2.2.1–A.2.2.6. Standard protocols for these communications methods have been published by the IEEE as the 802.5 token ring proposal, and a similar report by the European Computer Manufacturers organization.

Each LAN requires a protocol handling circuit to carry out four major functions. First, passing frames must be examined, their status recorded and, if necessary, marked or deleted by a monitor. Second the protocol handling circuit must recognize frames and copy those with appropriate addresses, signal the return of transmitted frames to a transmit state machine and signal successful copy and/or address recognition by setting flag bits at the end of the frame. Third the circuit must be able to transmit frames in various modes and for the token transmission mode it must be capable of examining and recognizing incoming tokens to determine whether or not to use them. It must be able to release a token upon return of its frame or on request. Fourth, a proper priority token protocol must be activated by the release of a token from the transmit machine and then remain active as long as necessary as determined by a priority algorithm. While active it must examine passing tokens and modify them as necessary according to a fairness algorithm. As this involves copying a field from the end to the start of a byte sufficient delay must be allowed in the data path for this translation to be accomplished. It is with the priority protocol aspect that the present invention is concerned.

Accordingly, it is an object of the invention to provide an efficient operative priority protocol circuit for LAN system.

SUMMARY OF THE INVENTION

According to the present invention there is provided a priority token protocol circuit for a token ring local area network adaptor having a data-in line for serially carrying tokens/frames and a shift register delay of at least 18 bauds with an input coupled to the data-in line. A TTT stack is coupled to the shift register delay for serially storing values of old token indicators. An III stack is provided for serially storing values of new token priority indicators. TTT means is coupled to the TTT stack for temporarily storing a last old token placed onto the TTT stack and serially outputting its bits. The stacks shift up or down bit by bit in response to UNSTACK or STACK control signals and are cleared in response to a clear signal. III means is coupled to the III stack for outputting bit by bit the value of a last new token priority indicator "I" stored on the III stack while at the same time maintaining the value of the last new token priority indicator on the III stack immediately following the outputting and for replacing the last new token priority indicator stored with a reservation indicator "R" of the token and discarding the last new token priority indicator. Means are provided for comparing "P" and "I", "R" and "P" and "R" and "T". An output data modifier has inputs coupled to an output of the shift register delay, the TTT means, to a selected bit position of the shift delay and transmits a selected one of the inputs to the output in response to selected control signals applied thereto. Finally, a priority token state machine having inputs coupled to outputs of the comparing means and to an IEQZ output of the III stack is operative in response to selected combinations of its inputs to issue control signals to the stacks, the III means, the TTT means and the comparing means.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
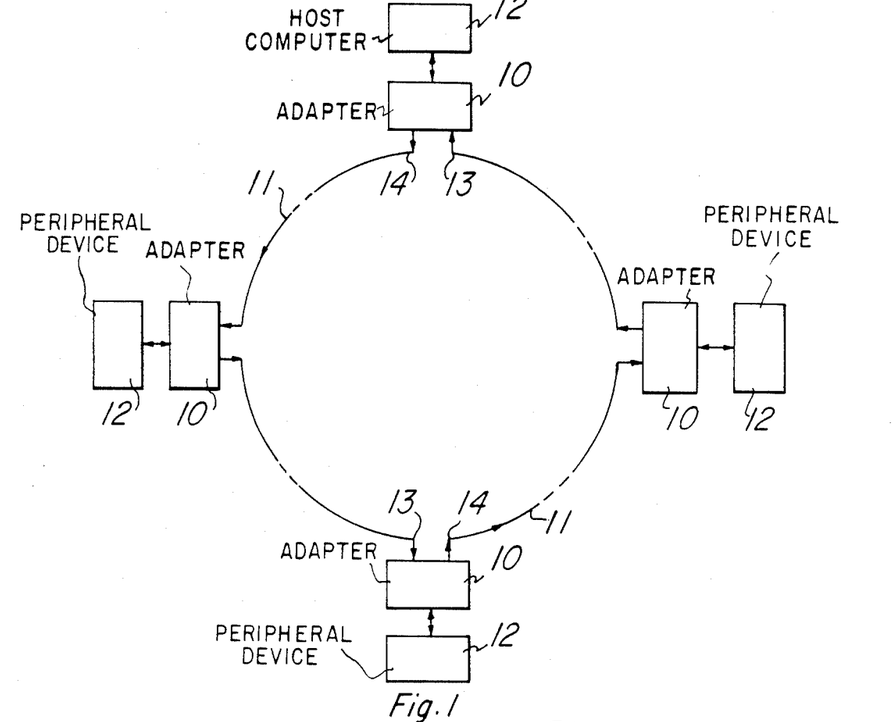
FIG. 1 is a schematic diagram of a token ring local area network in which host processors are interfaced to the ring with an adaptor.

Referring to FIG. 1 there is shown a schematic diagram of the mechanism for controlling the flow of data in a token-ring adaptor 10 in series with the ring unidirectional transmission lines 11. Each line 11 has a receiving end 14 and a transmitting end 13 which couple to each adaptor 10. The adaptor 10 acts as a network interface to a host computer 12 or to a peripheral device (not shown) under the control of a host computer. It handles the basic transmission functions including frame recognition, token generation, address decoding, error checking, buffering of frames and link fault detection.

In the system of FIG. 1 the sending node 10 can determine on its own when it may begin transmitting based on the status of the line at the time. The control scheme involves transmission of data from one node to another by using a particular frame format. The binary data originating within a node 10 must be encoded for effective transmission.

Figure 2A:
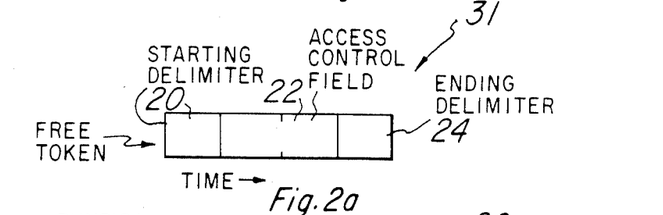
FIG. 2a is a schematic diagram of a free token for transmission of the ring.

Referring to FIG. 2(a) there is shown the frame format corresponding to a "free token" which is passed sequentially from node-to-node around the ring giving each an opportunity to transmit data when it receives the "free token". The frame format of a free token 31 is shown in FIG. 2a as including a starting delimiter 20 that identifies the start of a frame, an access control field 21 which provides for different priority levels of access to the ring 11 and an ending delimiter 24 to identify the end of the frame. A node having data to transmit can modify the "free token" frame 31 by adding additional information to it. A node that initiates a frame transfer must remove that frame from the ring and issue a free token upon receipt of the physical header (i.e. the starting delimiter and access control field for a given time.

Figure 2B:
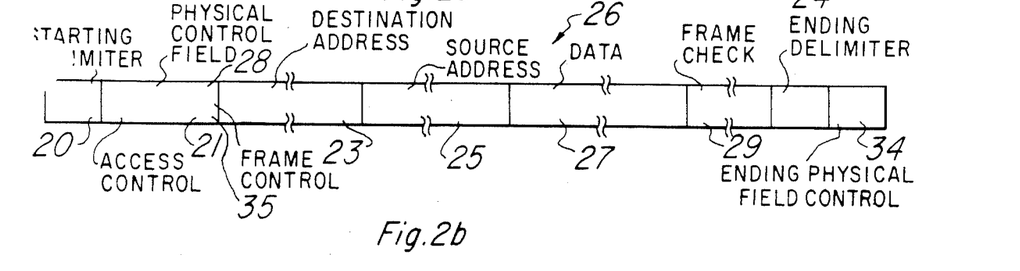
FIG. 2b is a schematic diagram of a frame.

The frame format for a data containing frame 26 is seen in FIG. 2b. Frame 26 also has a physical starting delimiter 20 and ending delimiter 24, a physical control field 28, a destination address 32 and a source address 34. The physical control field 28 has a first byte 21 being the access control and a second byte 35 contains data 27, a frame check sequence 29 and an ending physical containing further ring management information. The frame 26 also control field 34 which is used for certain physical control functions. The frame check sequence 29 is a 32 bit redundancy check used to detect errors within a second byte of the physical control field, the address fields or the data field itself.

Figure 3:
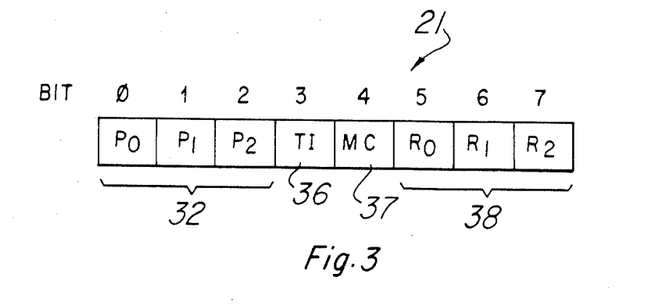
FIG. 3 is a schematic diagram of the access field of a token or frame.

The access control field 21 shown in more detail in FIG. 3 of a token/frame has a total of 8 bit positions. The first three positions carry the three bits of the priority indicator 32. The fourth bit is the token indicator which is set to "1" for a "busy" token and to "0" for a free token. The fifth bit is the monitor count which is set to "1" by a station which acts as an Active Monitor when the priority of the token is greater than zero. If the frame or token comes back to the Active Monitor station with the Monitor count bit still at "1" that token/frame is not repeated back onto the ring. Instead the ring is purged and an error counter in the Active Monitor is incremented.

Figure 4:
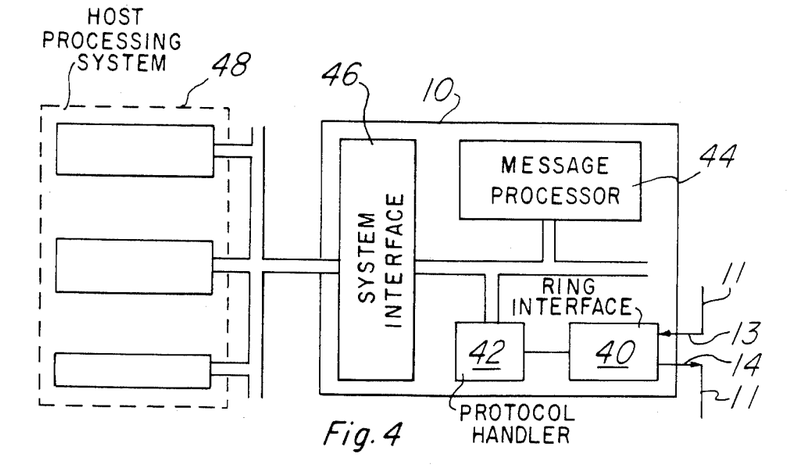
FIG. 4 is a schematic diagram of the parts of an adaptor together with its coupling to a host processor.

The circuit structure employed in the adaptor 10 is shown in FIG. 4 and consists of a ring interface system 40, a protocol handler 42, a message processor 44, a system interface 46 coupled to a host processor system 48. The ring interface system 40 includes line drivers and receivers, a circuit for employing phase lock loop on incoming data to extract the baud frequency of the data stream and fault detection such as signal loss, wire fault and frequency error (not shown). Ordinarily, the foreging blocks are formed on semiconductor chips preferably in MOS form.

The protocol handler 42 is a system for executing various protocol functions such as address recognition, serial to parallel and parallel to serial conversion, encoding to and from differential Manchester code, token control buffer management, compensation for phase jitter and priority control of frames. The protocol handler 42 receives frames and clock signal from and transmits frames to the ring interface 40.

The message processor 44 has a 16 bit central processing unit with 2.75 kilobytes of parity protected random access memory for frame buffering and working storage, a process timer for the ring protocol programs, and includes code stored in read only memory in the protocol handler 42.

The system interface 46 interfaces the message processor 44 and the protocol handler 42 with the attaching product which, in this case, is shown as the host processing system 48. Through the system interface 46 the adapter 10 passes frame data, operational parameters, and extensive diagnostics and error codes which provide the host processing system with detailed information on the operation of the adapter 10.

Figure 5:
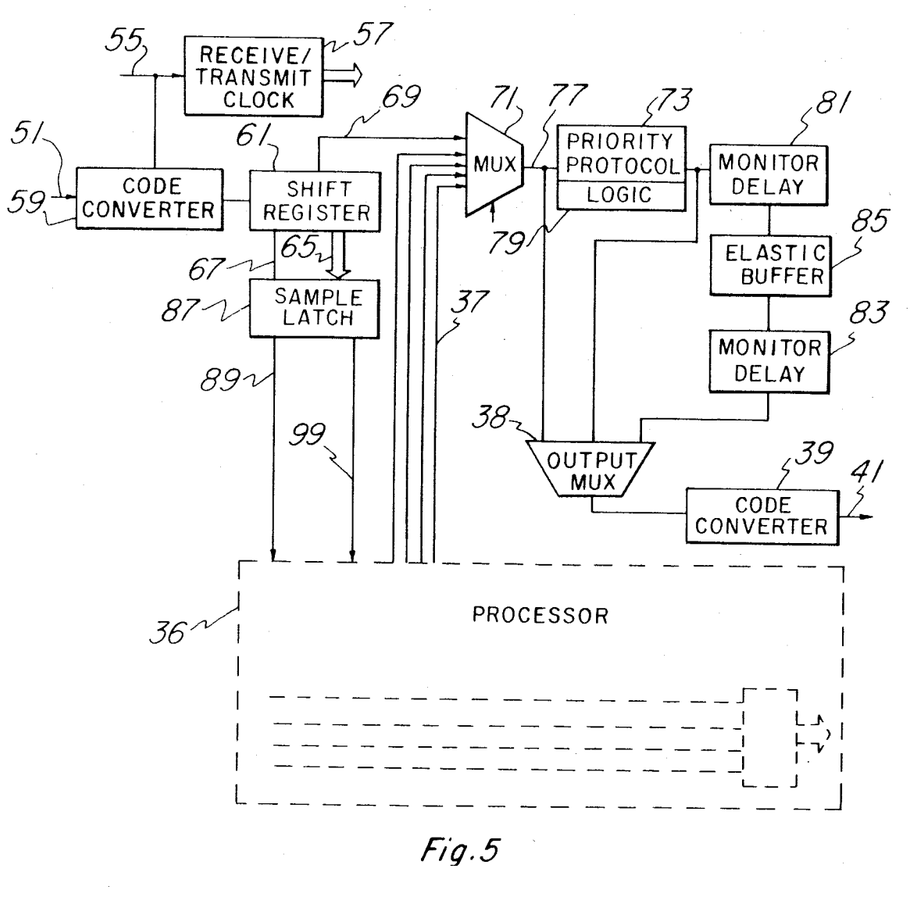
FIG. 5 is schematic circuit diagram of the protocol handler.

The protocol handler 42 as seen in FIG. 5 consists of a converter 59 for converting the incoming data on line 51 which is in Manchester encoded form to transitional form. After conversion the transitional data then enters a 16 baud shift register 61 where the contents are continuously compared against the relevant delimiter sequences by a bank of precharge/discharge nor gates (not shown). In the present case a starting delimiter (SDEL) is received whenever the 16-baud sequence denoted by transitional 1100001001101000000 is detected and an ending delimiter (EDEL) is received whenever the 14-baud sequence denoted by transitional 11000010011010000000 is detected and an ending delimiter (EDEL) is received whenever the 14-baud sequence denoted by transitional 110110110110x0 where "x" designates a "don't care" baud is received.

Line 55 is coupled to the output of a voltage controlled oscillator (not shown) located on the ring interface circuit chip 40. The latter output has a period equal to one baud on the ring with each half-bit of data being provided on the falling edge of the output on line 55. A phase lock loop on the incoming data stream extracts the baud frequency from the data signals. Receive/transmit clock generator 57 uses the signal on line 55 to generate the clocks for all of the serial path shift registers and state machines (not shown).

The first two storage cells in the delimiter decoder 61 16-baud shift register are sampled by baud sample latch 87 which is a 2-baud deep shift register. An input sample strobe signal on line 67 is generated by the receive clock generator 57 and applied to sample latch 87 causing the latter to sample the incoming serial data and violation bauds. Clocking on the rising edge of the internally generated baud clock 57 on line 67 results in the output of two signals on lines 89 and 99 corresponding to sampled data and sampled code violations which are the transitionally encoded values of the first and second baud, respectively, for each bit.

Incoming data is also outputted from the delimiter decoder 61 serially on line 69 to one input of a data insertion multiplexer 71. Multiplexer 71 forms a single point of control over data insertion or modification in response to override signals from various state machines in a processor 36 and can force zeroes, ones or data from one of these sources into the serial data stream.

The output 77 from the multiplexer 36 is coupled to the input of both a transmit output multiplexer 38 and to a priority token circuit 73. The priority token circuit 73 inserts a 9-bit delay so that a station can modify the starting physical control field of a token to alter the actual or reserved priorities according to the priority token protocol indicated by the token or frame. This is done when a station wishes to transmit data. Logic circuits 79 associated with the priority token protocol circuit 73 are coupled to the latter and also to the output of a priority token state machine in the processor 36. The output of the priority protocol circuit 73 goes both to an input of the transmit output multiplexer 38 as well as to a 7.5-baud monitor delay 74 to allow time to eliminate starting delimiters from defective tokens.

The output of delay 81 goes to an elastic buffer 85 which absorbs accumulated phase jitter in the ring. During normal operation, only one station (the monitor) inserts its elastic buffer on the ring. As the accumulated phase delay around the ring varies, it is absorbed by the elastic buffer. The elastic buffer is a 7 plus or minus 6 deep, one baud wide first in-first out (FIFO) which maintains a minimum of 1 baud and a maximum of 13 baud between input and output. The elastic buffer is described in detail in my copending U.S. patent application Ser. No. 808,149 filed on Dec. 12, 1985.

The output of the elastic buffer 85 is directed into a second monitor delay 83 which delays the data a total of 22.5 bauds. This delay provides for the minimum ring length required to circulate a free token. With both monitor delays inserted the total delay through the protocol handler is 58 plus or minus 6 baud.

Finally, the output from the second monitor delay 83 forms the third input to the transmit output multiplexer 38. Multiplexer 38 transmits in order of priority the output of delay 83, the output from the priority protocol circuit 73 or repeat data out of output 77. The output from the transmit output multiplexer 38 goes to a transitional to Manchester decoder 39 which converts the encoding of data to Manchester form for transmission on the ring 11.

The processor 36 contains among other circuits various state machines (not shown) other than a priority protocol state machine to be described later which have precharge/discharge programmable logic arrays (PLA's) to conserve power for carrying out different control operations. For example, there is a serial receive state machine for controlling operation of the serial receive path, a serial transmit state machine for controlling operation of the serial transmit path, a monitor state machine for controlling the setting of a monitor count bit of a busy or priority free token to maintain the validity of the token, and an address compare state machine that controls recognition of addresses in a received frame. There is a monitor function to examine passing frames and record their status and to mark passing tokens and delete those already marked. There is a receive function which recognizes frames and copies those with appropriate addresses, signals the return of transmitted frames to the transmit state machine and signals successful copy and/or address recognition by setting flag bits at the end of the frame. There is a transmit function to transmit frames in various modes. To accomplish this a token transmission mode must enable the recognition and examination of incoming tokens to determine whether or not to use them.

The total monitor delay is split into two sections, one a 7.5-baud first monitor delay 81 and a second 24.5-baud delay 83 after the elastic buffer 85. The majority of the delay is placed after the elastic buffer 85 so as to allow efficient implementation of the elastic buffer clear mechanism.

In order to carry out the fairness functions of a token ring local area network data communication system in accordance with the standard protocols for these communications methods published by the IEEE as the 802.5 token ring proposal it is necessary to establish a priority protocol algorithm. The basis for such an algorithm according to the invention is the following. When one station has reserved a token with a priority reservation "R" greater than the present priority "P" of the token/frame and the station that issued the frame receives it back it must replace the existing priority "P" with the value of "R" and store both "P" and "R" for later use. It must also clear the priority reservation field and the monitor count bit of the token it passes on or issues so that the active monitor does not purge the ring when the modified token passes by. Furthermore, the information stored must be capable of being stacked, unstacked or stored on last in-first out (LIFO) new and old priority indicator storge buffers corresponding to the above-mentioned "R" and "P" values, respectively.

When a given station receives a token which has circulated the ring with a priority equal to the last value pushed onto the "new" LIFO buffer the priority protocol control must substitute the "old" LIFO buffer value for the priority indicator of the token, leave the priority reservation of the token as is, clear the monitor count bit and "pop" or get rid of the last values stored in both "new" and "old" LIFO buffers.

When a station receives a token which has circulated the ring with the "new" priority, but the priority reservation field indicates that some station wants the priority of the token to be greater than the "old" priority but less than the "new" priority, the priority protocol control must substitute the "R" for the "P" of the token and the "R" for the last value in the "new" LIFO, and clear the reservation field and monitor count bit of the token.

When a station receives a token or frame for which "P" is less than the last value pushed onto the "new" LIFO buffer an error has occurred either in the values stored on the buffers or by corruption of the ring data through some unknown means. A means must be provided to clear the "old" and "new" LIFO buffers to allow for the first possibility. Error detection circuits take care of the latter possibility.

Finally, a means must be provided to remove the priority protocol control when a station's LIFO buffers are empty and no reservation request greater than zero exists on the token.

Figure 6:
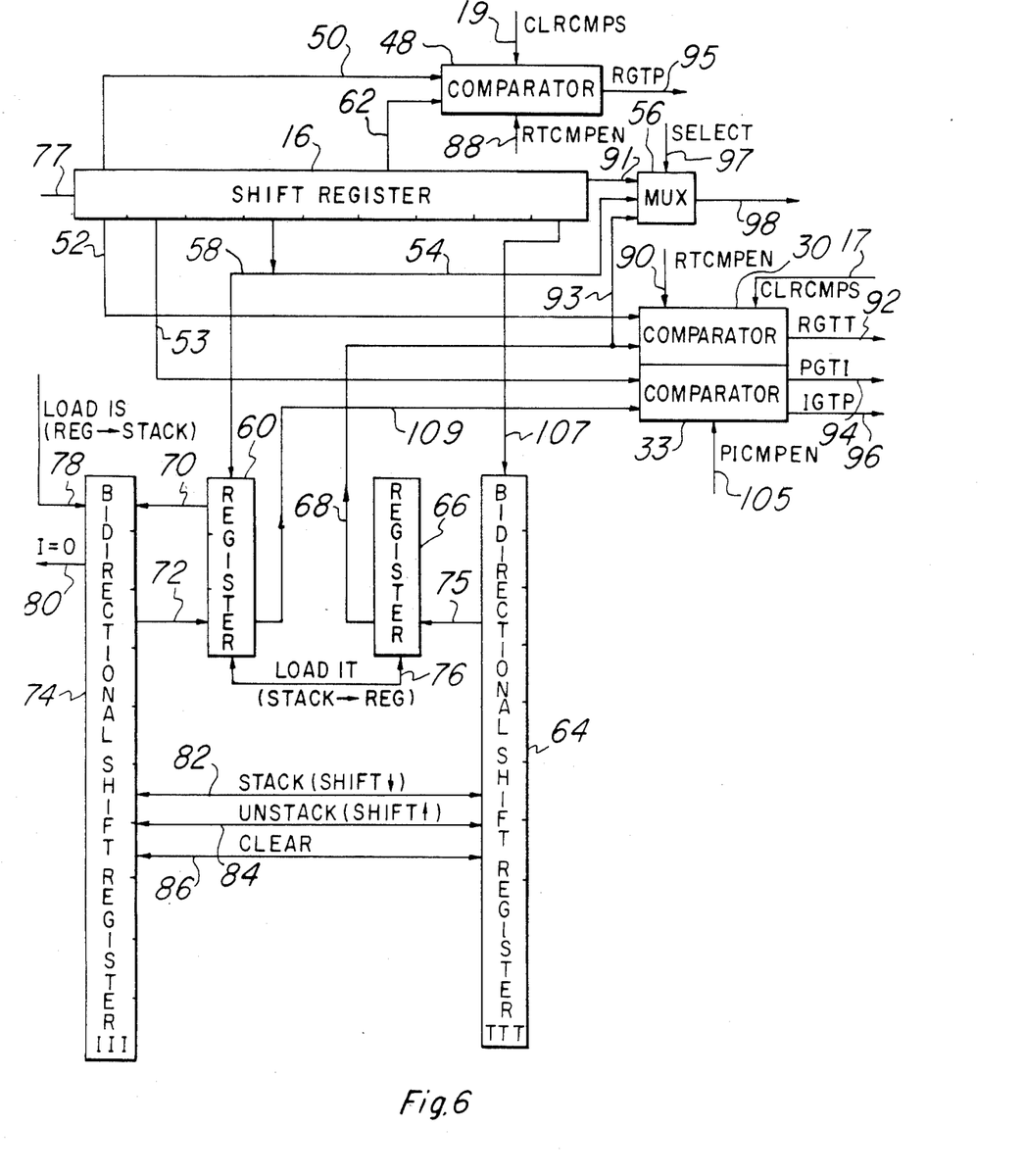
FIG. 6 is a circuit diagram of the priority token data handling circuitry of the access field bits.

The above five functions require evaluation of the comparisons $P>I$, $P<I$, $R>P$, $R>T$, and $I=0$ where I and T are the last values stored in the "new" and "old" buffers, respectively. Logic circuity for carrying out the above comparisons as shown in FIG. 6 includes a Data-In line 77 coupled to an input of an 18 baud shift register or delay 16 as well as to first inputs of serial comparators 18 and 30. Since R must be compared with P before any decision can be made as to the value of the outgoing priority indicator, at least 8 bits of delay must be used. An extra bit of delay is used to allow the R versus P comparison to be completed one clock cycle before P arrives at the output of the shift register 16. Taps are made at the midpoints of bits 1, 2, 4, 6 and 9 of shift register 16. The tap at the first bit goes by line 50 to one input of comparator 18 and by line 52 to an input to comparator 30. The tap at the second bit goes to a first input of serial comparator 33 while that at bit 4 goes by line 54 to an input to multiplexer 56 and by line 58 to III register 60.

The tap at the sixth bit goes to a second input of serial comparator 18 by line 62. The tap at the ninth bit goes by line 107 to an 8 bit LIFO (last in first out) TTT stack 64. Coupled to TTT stack 64 is a TTT register 66 which receives the three priority bits of a frame by parallel transfer from the top 3 bit positions of the TT stack. The midpoint of the third bit, of the TT register 66 is coupled by line 68 to a second input to serial comparator 30.

The III register 60 is coupled by transfer lines 70 and 72 to a 10 bit III LIFO stack 74. III register 60 parallel transfers its 3 bits into stack 74 along line 70 and the first 3 bits of stack 74 into the III register 60 along line 72 in response to control signals on lines 76 and 78, respectively. The "I" values in III register 60 are taken one bit at a time along line 109 to an input of comparator 33. A transfer control signal on line 76 also initiates the parallel transfer along line 75 of the first 3 bits in the TTT stack 64 into the TTT register 66. Control signals STACK, UNSTACK and CLEAR on lines 82, 84 and 86, respectively, cause the stacks 64 and 74 to shift up, shift down and to clear. The most significant bit of TTT register 66 is directed along line 68 to a second input of serial comparator 30 and also to a third input of multiplexer 56.

Comparators 18 and 30 each are controlled by a CLRCMPS signal on lines 19 and 17 which clear the comparators 18 and 30, 31 and an RTCMPEN signal on lines 88 and 80 which enable comparators 18 and 30. An output RGTP appears on line 95 as soon as a bit of the three bit priority reservation field of an incoming frame is greater than a corresponding bit of the three bit priority indicator field of that frame. A RGTT output from comparator 30 appears on line 92 whenever the reservation value "R" of a token exceeds the last value of priority stored in the TTT register 64. An PGTI signal appears on line 94 when the priority indicator value "P" is greater than the last priority value stored in the III register 60 and an IGTP signal appears on line 96 when the last value stored in the III register 60 exceeds the priority indicator value "P". If neither is set "I" must equal "P".

The output of bit 9 of the shift register 16 is directed on line 91 to an input of multiplexer 56 which is transmitted to the output on line 98 by an FMODCTL signal on SELECT line 97. The reservation bits are directed on line 54 to an input of multiplexer 56 which is transmitted to output line 98 on an FMODCTL*UNSTACK signal on SELECT line 97. The last stored value of priority in TTT register 64 is directed to a third input to multiplexer 56 on line 93 which transmits to output 98 in response to a FMODCTL*UNSTACK on SELECT line 97. An I=0 signal from III stack 74 is obtained on line 80 to indicate that the LIFO buffers are empty. A LOADIS signal on line 78 causes the top 3 bits of III stack to parallel load from to III register 60. The outputs on lines 95, 92, 94 and 96 are all directed to a priority token state machine which provides outputs that are governed by the inputs as well as the states through which the machine circulates. Output line 98 couples to a monitor delay circuit 81.

Operationally the priority token state machine and delay is responsible for changing the priority field of the physical control field of tokens on Local Area Network (LAN), required by the state of the priority and reservation fields of that token and by the history of the priority token machine itself. Priority protocol determination is introduced only once a free token has been released. The latter event can take place when the source address of an incoming frame is matched to the station or adapter address in the address state machine and associated circuitry (not shown). Since it is necessary to receive when transmitting in order to at least be in a position to decode a station's own source address in the event a token returns to that station before transmission has ended it is necessary for the protocol token protocol machine to operate off of the transmit clock as opposed to the receive clock (not shown).

Figure 7:
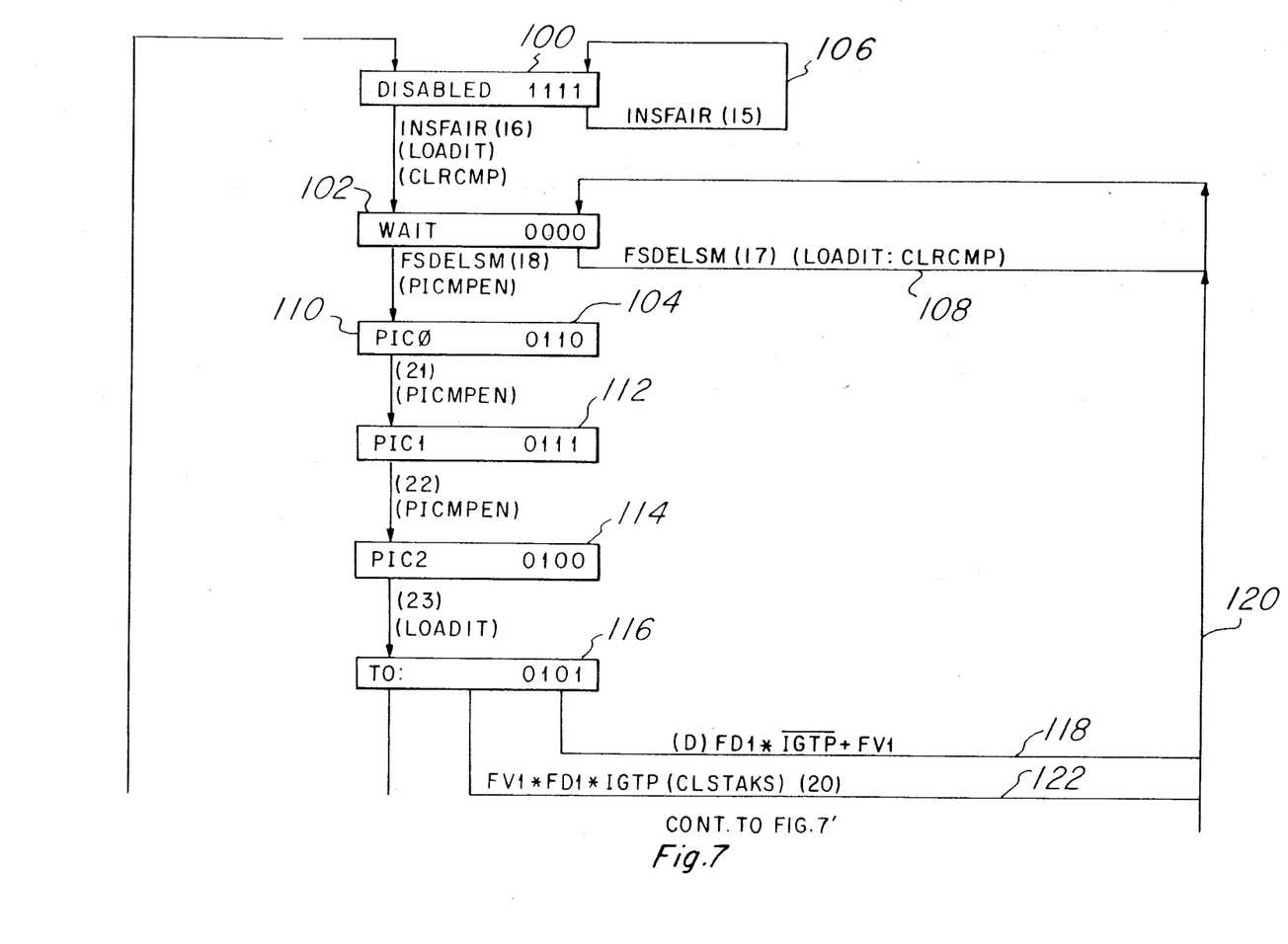
FIG. 7 is a flow diagram of the sequence of states and associated inputs and outputs of the priority token state machine.
Figure 8:
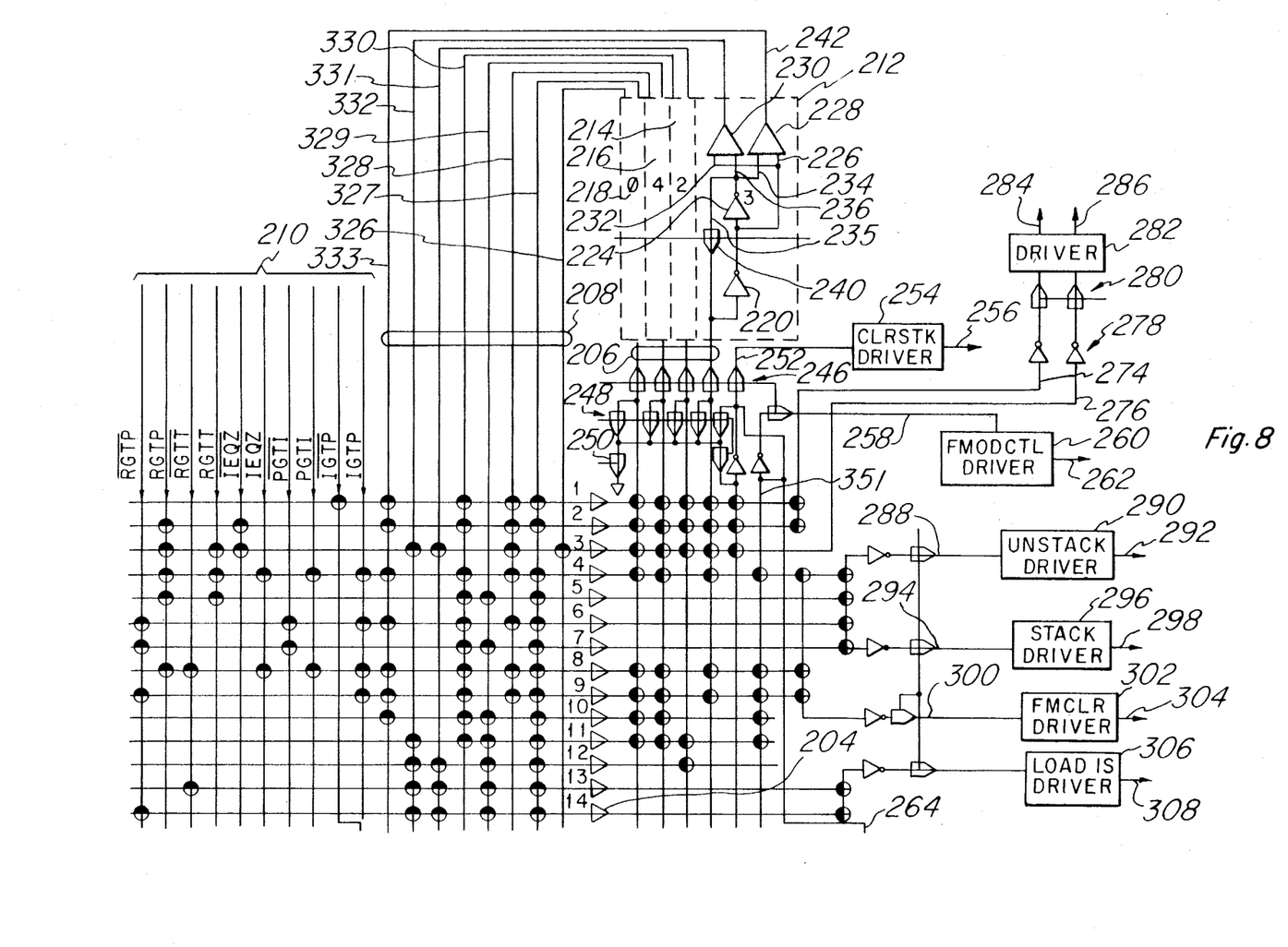
FIG. 8 is a circuit diagram of the fairness state machine.

The interaction of the logic circuitry of FIG. 6 with the priority token state machine shown in FIG. 8 can be understood by reference to the sequence of functions of the priority token state machine as set forth in FIG. 7. Once a station issues a free token it issues a INSFAIR signal (see FIG. 8) which causes the state machine to go from a "disabled state" 100 in which it follows a loop 106 to follow a path to a "wait" state 102. At the same time the state machine issues CLRCMP and LOADIT signals which clear the comparators and parallel transfer the top 3 bits of both the III stack 60 and the TTT stack 64 into their corresponding registers 60 and 66, respectively. The CLRCMP and LOADIT signals are now repeated each clock cycle as the system circulates about path 108 in response to FSDELSM signals. Once a start delimiter pulse is detected (indicated by FSDELSM) the priority token protocol state machine goes to PICO state 110 issuing a PICMPEN signal to activate comparator 33 and to initiate comparison of the 3 bits of the priority indicator of the token/frame with corresponding bits of the "new" or III register 60 proceeding from the most to the least significant bits in going from states PIC1 112 and PIC2 114. Following this another LOADIT signal is generated which parallel transfers the top 3 bits of the III stack 74 and TTT stack 64 into the III register 60 and TTT register 66, respectively. The priority token state machine goes from TOK state 116 to any one of three possible states depending upon the input signals present. If either there is a code violation (FV1) or the bit in position 1 of positions 0 to 13 of the priority token delay is "1" indicating a busy token as the Token Indicator bit is in this position at this time and the value in the III register 60 is less than or equal to the priority value of the token/frame then default path 118 is followed back to the "wait" state 102.

Path 122 leading back to the "wait" state 102 is taken if there is no code violation (i.e. FV1 implies it is a good token) and it is a busy token and the last value stored in the III register 60 is greater than P. The latter condition implies that the token priority has been corrupted as normally P can not be less than the last value pushed onto the III register 60 by the station. In this case the fairness state machine issues a CLSTAKS signal which clears the III and TTT stacks 74 and 64, respectively, before returning to the "wait" state.

The path leading to state MC 124 is taken if the token is not busy and it has no code violations. In the latter case the state machine issues an RTCMPEN signal which enables comparators 18 and 30. The state machine then issues two more RTCMPEN signals to allow comparison of the second and third bits of reservation field with corresponding bits of the priority field and the TTT register 66 as it passes through RTP0 state 126 and RTP1 state 128. Once again a LOADIT signal is generated parallel transferring the top 3 bits of the stacks 74 and 64 to their corresponding registers 60 and 66, respectively as the state machine moves to RTP2 state 130.

From RTP2 state 130 any one of 5 paths are possible depending upon the inputs. The default input along line 132 is taken if the value "I" in the III register 60 is less than "P" of the token, I is nonzero and "R" is less than or equal to "P". These conditions imply that the token has had its priority bumped up by another station and so the priority of the token must be reduced first by the bumping station. Thus, the fairness state machine returns to the "wait" state 102.

Path 140 is taken in the event "I" is greater than "P" or "I"=0 and "R" is less than equal to "P". The first condition indicates the "P" value of the token has been corrupted while the second condition indicates the stacks 74 and 64 are empty and no station has requested a reservation greater than the priority indicator of the token. In this case a return along path 142 to the "disabled state" 100 is made and priority token protocol is removed.

Path 138 is taken if the input conditions are "R" less than equal to "P" and less than or equal to "T", "I" equal to "P" and "I" not equal to 0. These conditions indicate that a token has circulated the ring with a priority equal to the last value pushed onto the III register, and that the return reservation R does not require any further state machine action. Thus the previous token state is restored. The priority token state machine substitutes the last value "T" stored in the TTT register for "P" of the token by issuing a select signal on line 97 to select line 93 into the multiplexer 56 for transmission so that the priority field of the token is substituted for by the "T" value aforesaid. The latter control signal is derived from an FMODCTL signal from line 262 of the state machine and an UNSTACK signal from line 292 of the fairness state machine fed into an "and" circuit to form a signal FMODCTL*UNSTACK. The fairness machine leaves the reservation value "R" of the token the same, clears the monitor count bit through the issuance of an FMCLR pulse from line 304 of the fairness state machine. The fairness machine applies the signal FMODCTL*UNSTACK to the SELECT line 97 of the multiplexer 56 and the signal UNSTACK on line 84 to stacks 74 and 64 three successive times in going along paths 138, 148 and 154. As a result all three bits of the "T" value are transmitted through multiplexer 56 and the stacks are shifted up a total of 3 bits thereby "popping" the last value stored in each stack. Path 134 is followed provided the inputs are "I"="P", "R" is less than or equal to "P", "I" is not zero and "R" is greater than "T". These conditions indicate that the token has circulated the ring with a priority equal to the last value pushed onto the III register 60 and some station wishing to transmit has issued a reservation "R" greater than the old priority value stored on the TTT stack 64. The priority token machine substitutes "R" for "P" on the token by issuing an FMODCTL signal from output 262 of the state machine which is directed to select line 97 of multiplexer 56 and results in the selection of input from line 54. In addition, an FMCLR signal generated on output 304 clears the monitor count bit 60. The "R" value is also loaded into the III register 60 along line 58.

The reservation of the token is zeroed by the FMODCTL signal causing the multiplexer 56 to transmit zeroes over this field of the token.

Path 136 is followed if the inputs are "I" less than or equal to "P" and "R" greater than "P". Such inputs indicate that a new token priority level is to be put into the III stack 74. This may require replacement of the last value stored previously or retention of the last stored value is required. In this case an FMCLR signal is generated on line 304 which clears the monitor count, and FMODCTL signal is issued on line 262 and a stack signal is generated on line 298. The latter signal shifts the bits in the III and TTT stacks down one bit position. Paths 146, 152 and 158 are followed and in paths 146 and 152, the stack operation is repeated so that a total shift of 3 bit positions accors. In path 158 the LOADIS signal is generated which parallel transfers the 3 bits in the III stack into the 3 top bits (now empty) of the the III stack. The FMODCTL signal together with the STACK signal causes the line from the output of the 9th bit position of delay 16 to be transmitted through the multiplexer 56 thereby retaining the old priority indicator.

If R is greater than P and I equals P (or not if I does not equal P) then again paths 146, 152 and 158 are followed except that now there is no STACK signal generated. In this case the LOADIS signal causes the last stored "I" value to be overwritten by the reservation value in the III register 60. The FMODCTL signal together with a STACK signal causes transmission of the T value in the TTT register from line 93 to output line 98. In both of the latter two cases the system returns by path 120 to the "wait" state 102.

In going along path 138 and paths 148, 154 and 160 if the III stack is empty after popping its last stored value then path 142 is followed. In this case an REMPD2 signal is issued on line 286 which causes the removal of the priority token delay 16 from the data path (not shown). A CLSTAKS signal is also issued on line 256 which clears stacks 74 and 64 by application to line 86.

The priority token state machine shown in FIG. 8 performs the various functions set forth in the flow diagram of FIG. 7. In order to simplify the diagram block diagrams have been used to designate driver circuitry which may incorporate several components but which an ordinary skilled person can easily design. The priority token machine shown consists of a plurality of field effect transistors (FETS) arranged in a plurality of columns and rows to form an AND plane 200 and an OR plane 202 the rows of which are each coupled together by a gated clock 204 shown in simplified form. The function of the latter is simply to apply a high voltage to its corresponding row line in the AND plane 200 once each clock cycle NTCLK and to transmit a high output once each clock cycle TCLK (the complement of NTCLK) if none of the FETS have fired due to inputs on lines 210 or 212 being present. The FETS have been designated by circles half of which are dark and the other half light. Each FET in the AND plane 200 has its gate connected to a corresponding column line and its source-to-drain path connected between the associated row and ground. In the OR plane each FET has its gate connected to a corresponding row line and its source-to-drain path connected between an associated column line and ground. In addition to the previously mentioned input lines the AND plane 200 has lines 326, 327, 328, 329, 330, 331, 332, and 333 which correspond to the present state of the machine. Lines 326, 328, 330, and 332 correspond to the most to least significant "1" bits, respectively, while lines 327, 329, 331, and 333 correspond to the most to least significant "0" bits, respectively. Thus, for example, row 1 is in the 1001 state.

Lines 342, 344, 436, and 348 generally designated as next state lines 206 in the OR plane 202 correspond to the next state to which the state machine will move after the present state. The presence of an FET on one of these lines indicates a binary "1" bit while the absence of an FET indicates a binary "0" bit. Thus, for example the next state after leaving the 1001 state is the 1111 state given the inputs on row 1 (or on row 2). Each of the columns 206 corresponding to the next state couple to a pair of complementary present state lines on the AND plane 200 through a circuit such as is shown in block 212. The circuits in blocks 214, 216, and 218 are all identical to that of block 212. Line 348 is connected through a corresponding source-to-drain path of a field effect transistor 246 to and inverter 220 the output of which couples to the input of another inverter 224 and to an inverting input of a driver 228 and a non-inverting input of a second driver 230. Drivers 228 and 230 are simply a push-pull pair. The output of inverter 224 goes both to a non-inverting input of driver 228 and an inverting input of driver 230 as well as through transistor 240 to refresh the input of inverter 220. The output of driver 228 goes along line 242 to input line 333 while that from driver 230 goes along line 244 to input line 332. Transistors 248 and 250 operate on each NTCLK clock cycle to ground lines 342, 344, 346, 348, 349, 351 and 264.

Output column line 349 goes through an inverter driver and gated transistor 246 to circuit 254 which produces a CLRSTK signal on line 256 whenever either input line IGTP* is low (and therefore complementary input line IGTP is high) or input line 1EQZ* is low and RGTP is low.

Output column line 351 goes through an inverter and a gated one of transistors 246 along line 258 to an FMODCTL driver 260 which produces the FMODCTL signal on its output line 262.

Lines 274 and OR plane row line 3 are directed by lines 274 and 276, respectively, into inverters 278, through gated transistors 280 into driver circuit 282 to produce the NREMFD1 and NREMFD2 signals on lines 284 and 286, respectively.

A column line coupled to the last FET's on OR plane rows 4 and 5 couple through an inverter and gated transistor to line 288 which is the input of UNSTACK driver circuit 290 which produces the UNSTACK signal on output line 292.

Similarly, a column line coupled to the last FET's on OR plane rows 6 and 7 go through an inverter and gated transistor to line 294 which is the input to STACK circuit 296 which produces the STACK signal on its output line 298.

The second last transistors on OR plane rows 4, 9 and 10 are coupled to a column line which couples through an inverter and gated transistor to line 300 which inputs to FMCLR driver 302 that produces the FMCLR signal on its output line 304 in response to the aforesaid column line going low.

A column line coupled to the transistors on OR plane rows 13 and 14 connect through an inverter and gated transistor to LOADIS driver 306 on whose output line 308 there is produced the LOADIS signal in response to the latter column line going low.

The column line coupled to the last transistors on OR plane rows 16 and 17 connect through an inverter 266 and gated transistor 268 to CLRCMP circuit 270 which produces a CLRCMP signal on line 272 in response to the latter column line going low.

Column line 350 goes through an inverter and gated transistor to line 310 which forms the input of LDSHFT circuit 312 which produces a LOADIT signal on line 314 and a SHIFTIT signal on line 316. The SHIFTIT signal is produced on every clock cycle that the LOADIT signal is not generated and is used to shift bits down the register 60 and 66 on a continuous basis.

Column lines 351 and 352 in a similar manner feed into drivers 318 and 320 to produce PICMPEN* and RTCMPEN* signals on lines 322 and 324, respectively.

By way of example, if the state machine is in the disabled state 100 whose present state in binary form is 1111 as is indicated by rows 15 and 16, it responds to inputs INSFAIR* on row 15 and INSFAIR on row 16. If the input INSFAIR is high, INSFAIR will be low, line 16 will be high and column lines 350 and 264 go low (all of the column lines are connected through depletion mode transistors (not shown) to a high voltage) resulting in a signal LOADIT on line 314 and a CLRCMP signal on line 272. As the next state indicated on row 16 is that defined by binary 0000 the state machine proceeds to that state which is "wait" state 102. Thus, it is relatively easy to follow the state machine from one state to another if the inputs are known or through various alternative paths for various possible inputs.

By making the architecture of the priority protocol system serial, serialized values of "P" and "R" can simply be tapped off of the fairness delay 16 without the need to include "P" and "R" hold latches. In addition, serial magnitude comparators can be used, which are inherently simpler than their parallel equivalents. The LIFO stacks become simple shift registers as stacking and unstacking become serial operations. Modification of outgoing data is also easily accomplished by feeding delayed values of data, "R" and "T" into a 3 to 1 muliplexer rather that using 3 multiplexers as would be required for a parallel system.

By making a judicious choice of bit significance in the stacks the length of the stacks can be reduced. Because of the protocol there is only one combination of stacked "I"s and "T"s that needs four levels to be stacked. These are the following:

III stack=111:101:011:001

TTT stack=110:100:010:000

By reversing the bit order in each triplet one gets the following:

III stack=111:101:110:100

TTT stack=011:001:010:000

Thus, only 10 III stack bits are necessary and 8 TTT stack bits.

Figure 9:
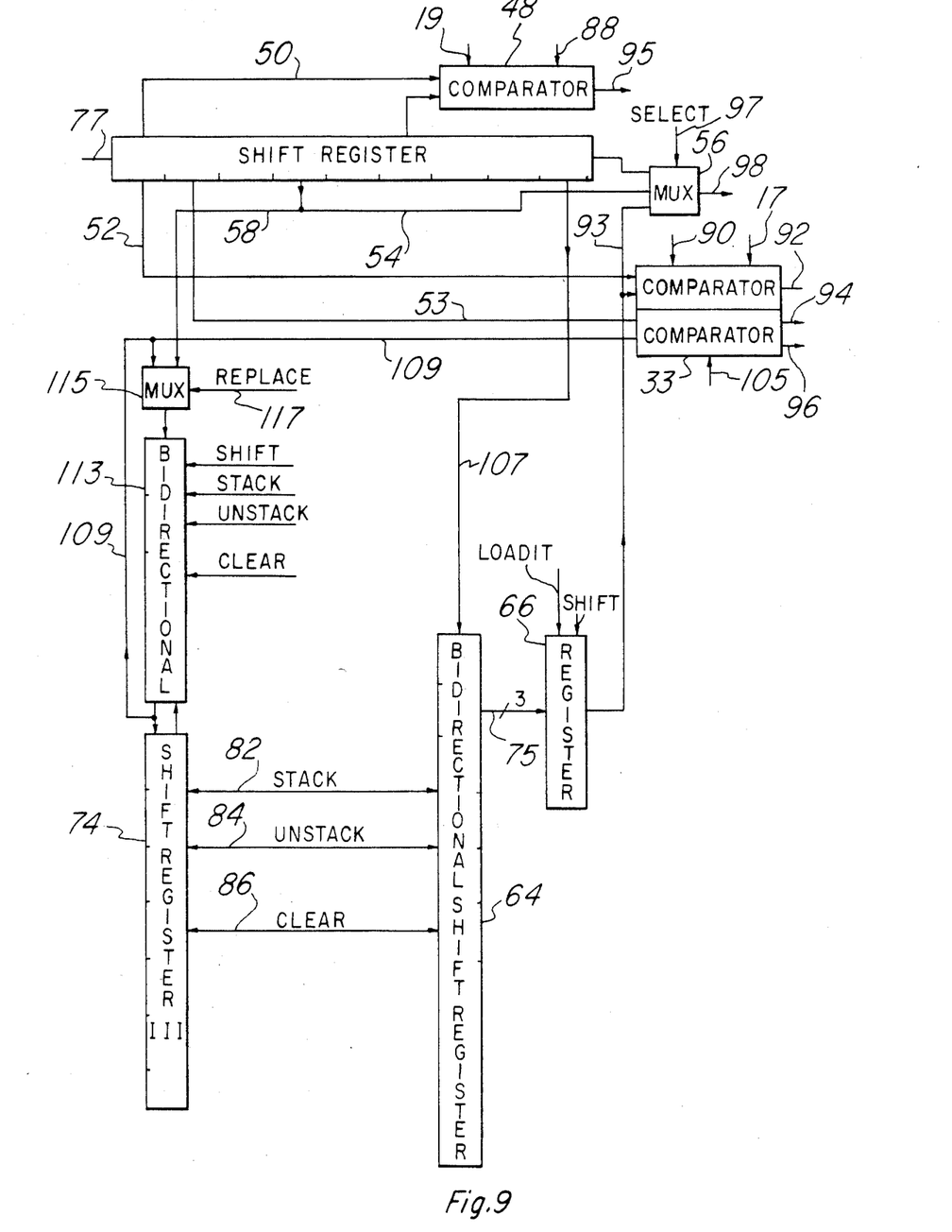
FIG. 9 is a circuit diagram of an alternative variant of the priority data handling circuitry.

An alternative variant of the logic scheme is shown in FIG. 9 in which like reference numbers indicate like parts as in FIG. 6. In this case the 3 bit III register is avoided by circulating the top 3 bits of the III stack 75 in response to a SHIFT signal on line 77. In this case an additional multiplexer 79 is employed which is operative to shift "I" data through if a "replace" input is inactive. When "replace" becomes active "shift" becomes inactive otherwise the III values in the stack would be corrupted. Thus, when "I" values are to be taken to comparator 33 they are removed using the shift signal and returned through the multiplexer 79. When a new "R" value is to be pushed onto the stack 75 the "stack" signal becomes active together with the "replace" signal so that all values are shifted down together. When the "I" value is to be replaced then both the "shift" and "replace" signals become active so that the values on line 58 from the token's reservation field pass the multiplexer 79 and the shifted values of I fed to the multiplexer 79 do not.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A fairness protocol circuit for a token ring local area network adaptor having a data-in line for serially carrying tokens/frames, comprising:
   a shift register delay of at least 8 bauds with an input coupled to said data-in line;
   a TTT stack coupled to said shift register for serially storing values of old token priority indicators;
   an III stack for serially storing values of new token priority indicators;
   TTT means coupled to said TTT stack for temporarily storing a last old token "T" placed onto said TTT stack and serially outputting its bits;
   stack control means for shifting said III and TTT stacks up or down bit by bit or clearing said stacks in response to a stack control signal;
   III means coupled to said III stack for outputting bit by bit the value of a last new token priority indicator "I" stored on said III stack while at the same time maintaining the value of said "I" on said III stack immediately following the outputting and for replacing said "I" with a reservation indicator "R" of the token and discarding said "I";
   PvsI comparing means having inputs coupled to a second bit position of said shift register and to said III means and operative to provide outputs if the value of the last new token priority indicator "I" is less than or greater than the value of the token priority indicator "P";
   RGTP comparing means having inputs coupled to said shift register first and sixth bit positions and operative to provide an output if the value of the token reservation "R" is greater than the token priority indicator "P";
   RGTT comparing means having inputs coupled to said shift register first bit position and to said TTT means and operative to provide an output if the value of the token reservation "R" is greater than the value of the last old token priority indicator "T";
   an input selector inputs of which are coupled to an output of said shift register, to said TTT means to the fourth bit position of said shift register and a select control signal which transmits a selected one of said input selector inputs to its output in response to the select control signal applied thereto; and
   a state machine having inputs coupled to outputs of said PvsI, RGTP, RGTT comparing means and to said IEQZ output from said III stack and operative in response to selected combinations of its inputs to issue control signals to said stacks, said III means, said TTT means, and to said PvsI, RGTP, RGTT comparing means.

2. A circuit according to claim 1, wherein said TTT means is a 3 bit serial TTT register coupled to the first 3 bits of said TTT stack and operative to parallel transfer the first 3 bits of said TTT stack into said TTT register in response to a LOADIT signal applied thereto.

3. A circuit according to claim 1, wherein said III means is a 3 bit serial III register coupled to the first 3 bits of said III stack and operative to parallel transfer its 3 bits into the top 3 bit positions of said III stack in response to a LOADIT control signal and wherein said III stack transfers its top 3 bits into corresponding bit positions in said III register in response to a LOADIS control signal and said III register shifts its bits out an output end opposite an input end thereof bit by bit continuously except when being loaded from said III stack.

4. A circuit according to claim 1, including a multiplexer having an output coupled to an input of said III stack and an input coupled to said shift register delay wherein said III stack is separated into a 3 bit upper portion having the stack input and a lower portion and said III means is a circulating conducting line coupled to an output of said top portion and to another input of said multiplexer and said top portion shifts its bits bit by bit out of its output end and said multiplexer passes the shifted bits on said circulating line back to the input of said stack in response to a SHIFT control signal, and said stack shifts its bits down bit by bit in response to a STACK control signal and up bit by bit in response to an UNSTACK control signal all of said stack control signals being provided by said stack control means.

5. A circuit according to claim 2, wherein said shift register delay has 9 baud positions.

6. A circuit according to claim 5, wherein said output data modifier is a multiplexer having its said third input coupled to a fourth baud position of said shift register delay.

7. A circuit according to claim 6, wherein said PvsI, RGTP and RGTT comparing means are each serial magnitude comparators.

8. A circuit according to claim 7, wherein the first baud position of said shift register delay is coupled to an R input to said RGTP comparator and to an R input of said RGTT comparator, the second baud position is coupled to a P input of said PvsI comparator, and the ninth baud position is coupled to an input of said TTT stack.

9. A fairness protocol circuit for a token ring local area network adaptor having a data-in line for serially carrying tokens/frames, comprising:
   a shift register delay of at least 8 bauds coupled to said data-in line;
   a serial bidirectional shift register TTT stack coupled to said shift register delay for serially storing values of old token priority indicators;
   a serial bidirectional shift register III stack for storing values of old token priority indicators;
   a 3 baud TTT shift register coupled to said TTT stack so that a parallel transfer of data in the top 3 baud positions of said TTT stack can be made to said TTT shift register in response to a LOADIT control signal and so a serial shift of data out of said TTT register is in continuous progress except when transferring data from said TTT stack;

III retention means coupled to said III stack for outputting bit by bit the value of a last new token priority indicator "I" stored on said III stack while at the same time maintaining the value of said "I" on said III stack immediately following the outputting and for replacing said "I" with a reservation indicator "R" of the token and discarding said "I";

a PvsI comparator having inputs coupled to a second baud position of said shift register and to said III retention means and operative to provide outputs if the value of the last new token priority indicator "I" is less than or greater than the value of the token priority indicator "P";

an RGTP comparator having inputs coupled to said shift register first and sixth bit positions and operative to provide an output if the value of the token reservation "R" is greater than the token priority indicator "P";

an RGTT comparator having inputs coupled to said shift register first baud position and to said TTT means and operative to provide an output if the value of the token reservation "R" is greater than the value of the last old token priority indicator "T";

an output multiplexer having a first input coupled to an output of said shift register, a second input coupled to an output of said TTT retention means and a third input coupled to a fourth baud position of said shift register delay and operative to transmit a selected one of its inputs to its output in response to control signals applied thereto; and a state machine having inputs coupled to outputs of said Pvs I, RGTP, RGTT comparators and to an IEQZ output from said III stack and operative in respone to selected combinations of its inputs to issue control signals to said stacks, said III means, said TTT means, and to said PvsI, RGTP, RGTT comparators.

10. A circuit according to claim 9, wherein said III means is a 3 baud serial III shift register coupled to the first 3 bauds of said III stack and operative to parallel transfer its 3 bits into the top 3 baud positions of said III stack in response to a LOADIT control signal and wherein said III stack transfers its top 3 bits into corresponding bit positions in said III register in response to a LOADIS control signal and said III register shifts its bits out an output end opposite an input end thereof bit by bit continuously except when being loaded from said III stack.

11. A circuit according to claim 9, including a multiplexer having an output coupled to an input of said III stack and an input coupled to said shift register delay wherein said III stack is separated into a 3 baud upper portion having the stack input and a lower portion and said III means is a circulating conducting line coupled to an output of said upper portion and to another input of said multiplexer and said upper portion shifts its bits bit by bit out of its output end and said multiplexer passes the shifted bits on said circulating line back to the input of said stack in response to a SHIFT control signal, and said stack shifts its bits down bit by bit in response to a STACK control signal and up bit by bit in response to an UNSTACK control signal.

12. A method of controlling fairness protocol on a token ring local area network system on which circulate from station to station tokens and frames having an access priority field which includes a 3 bit priority field, a token indicator bit, a monitor count bit and a 3 bit priority reservation field, comprising:

detecting the arrival of an incoming or internally generated token/frame;

comparing the priority indicator "P" of a token/frame arriving at a given station with a new priority indicator "I" of the last token whose priority was modified by that station;

comparing the value of the reservation of the token/frame "R" with the value of the old priority indicator "T" of the last token whose priority was modified by that station;

comparing the value of "R" to that of "P";

replacing "P" of the token/frame by "R" if "R" is greater than "P" and storing the value of "R" as "I" and the value of "P" as "T" and clearing the "R" and monitor count of the outgoing token/frame;

replacing the priority indicator "P" of the token by the value of "T" if "P" equals "I" and discarding the last stored values of "I" and "T" and clearing the monitor count;

replacing "P" of the token by "R" if "P" equals "I" and "R" is greater than "T" and substituting "R" for the last stored "I" value and clearing the reservation and monitor count of the token;

discarding the values of "I" and "T" if "P" is less than "I";

removing fairness from being active if the value of "I" "T" and Rare Zero.

13. A method according to claim 12, wherein said comparing steps include storing said tokens in a shift register delay with at least 8 baud and sampling selected bit positions to obtain values of "P" and "R".

14. A method according to claim 13, wherein said comparing steps include storing a new "P" value of a token whose priority indicator has been modified serially in a last in-first out III stack and a previous value of priority indicator before modification serially in a last in-first out TTT stack.

15. A method according to claim 13, wherein said "P" and "R" values are stored serially in corresponding III and TTT stacks with their most significant bits first and their least significant bits last.

16. A method according to claim 15, wherein said III stack has 10 stack bits and said TTT stack has 8 stack bits.

17. A method according to claim 14, including 3 bit III and TTT serial shift registers for temporarily storing the last stored "I" and "T" values and coupled to said III and TTT stacks, respectively, for parallel transfer of the last stored value in each of said III and TTT stacks into said III and TTT registers, respectively, and said III register coupled to said shift register delay for receiving "new" priority indicator values of modified tokens and operable to parallel transfer such values to a last in 3 bit position of said III stack.

18. A method according to claim 17, wherein said replacing steps include coupling an output of said shift register delay to obtain an unmodified priority indicator, an output of a selected bit position of said shift register delay to obtain concurrently a bit corresponding to said unmodified priority indicator bit and an output of said TTT register to obtain concurrently a bit corresponding to said unmodified priority indicator bit and selecting one of said outputs in response to SELECT control signals to transmit desired values in priority indicator, reservation and monitor count fields of a passing token.

19. A local area network system, comprising:
a token/frame conducting ring;
a plurality of host stations; and
a plurality of adaptors coupled between said ring and respective host stations for interfacing associated host stations to said ring, wherein each adaptor has a token/frame priority protocol circuit for reading priority protocol values of circulating tokens/frames, and in response to a comparison of such values with priority values stored therein, either re-transmitting such tokens/frames or copying such tokens/frames and generating and transmitting new tokens/frames onto said ring;
wherein said token or frame priority protocol circuit includes;
means for detecting the arrival of an incoming or internally generated token or frame;
means for comparing a priority indicator "P" of an arriving token/frame at a given station with a new priority indicator "I" of the last token whose priority was modified by that station;
means for comparing a reservation value "R" of a token/frame with the value of an old priority indicator "T" of the last token whose priority was modified by that station;
means for comparing the value of "R" to the value of "P";
means for replacing "P" of the token/frame by "R" if "R" is greater than "P" and storing the value of "R" as "I" and the value of "P" as "T" and clearing the "R" and monitor count of the outgoing token/frame;
means for replacing "P" of the token by the value of "T" if "P" equals "I" and discarding the last stored values of "I" and "T" and clearing the monitor count;
means for replacing "P" of the token by "R" if "P" equals "I" and "R" is greater than "T" and substituting "R" for the last stored "I" value and clearing the reservation and monitor count of the token;
discarding the values of "I" and "T" if "P" is less than "I"; and
means for inactivating fairness when the values of "I" and "T" are zero and "R"=0.

20. A system according to claim 19, wherein said detecting means includes a shift register for temporarily storing an incoming token.

21. A system according to claim 19, wherein said "P" versus "T", "R" versus "T" and "R" versus "P" comparing means are each comparators.

22. A system according to claim 19 wherein said means for replacing "P" and storing "R" and "P" as values of "I" and "T" are a pair of bidirection shift registers.

* * * * *